Oct. 25, 1938.  W. S. H. HAMILTON ET AL  2,134,443
CENTERING DEVICE FOR LOCOMOTIVE TRUCKS
Original Filed Sept. 4, 1936   4 Sheets-Sheet 1
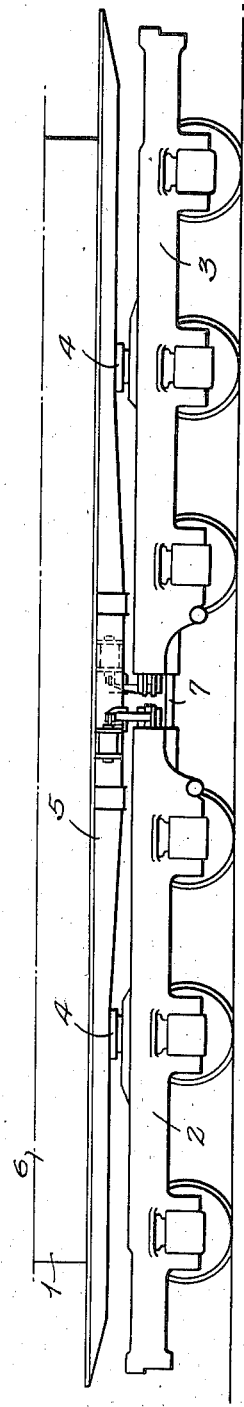
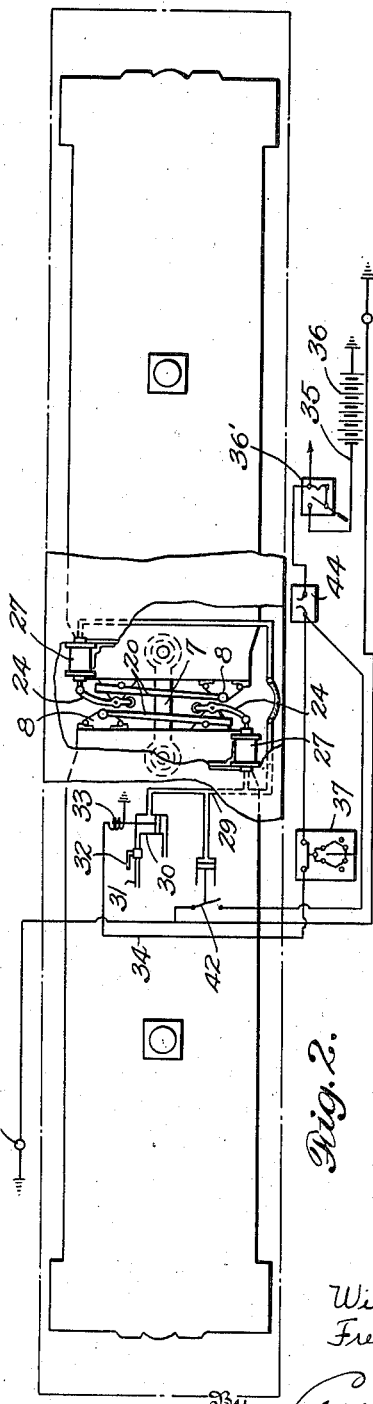
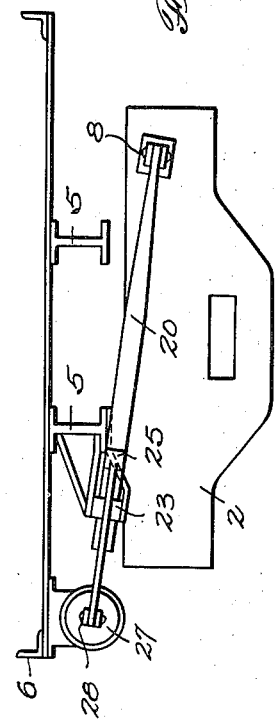
Inventor
William S. H. Hamilton and
Frederic W. Butt
By
Attorney Oct. 25, 1938.   W. S. H. HAMILTON ET AL   2,134,443
CENTERING DEVICE FOR LOCOMOTIVE TRUCKS
Original Filed Sept. 4, 1936   4 Sheets-Sheet 3

Inventor
William S. H. Hamilton and
Frederic W. Butt
By
Attorney

Oct. 25, 1938.   W. S. H. HAMILTON ET AL   2,134,443
CENTERING DEVICE FOR LOCOMOTIVE TRUCKS
Original Filed Sept. 4, 1936   4 Sheets-Sheet 4
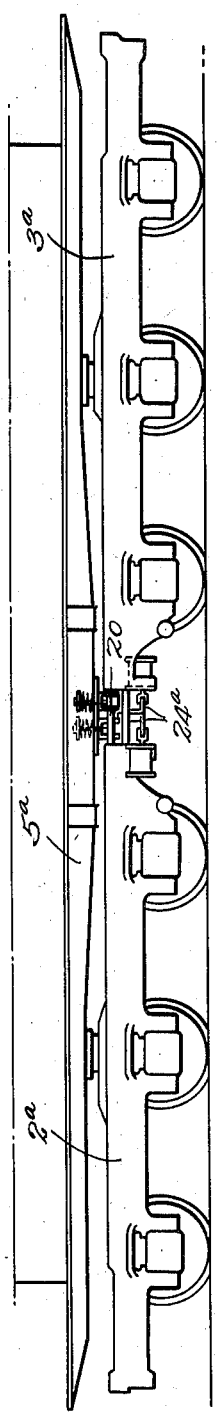
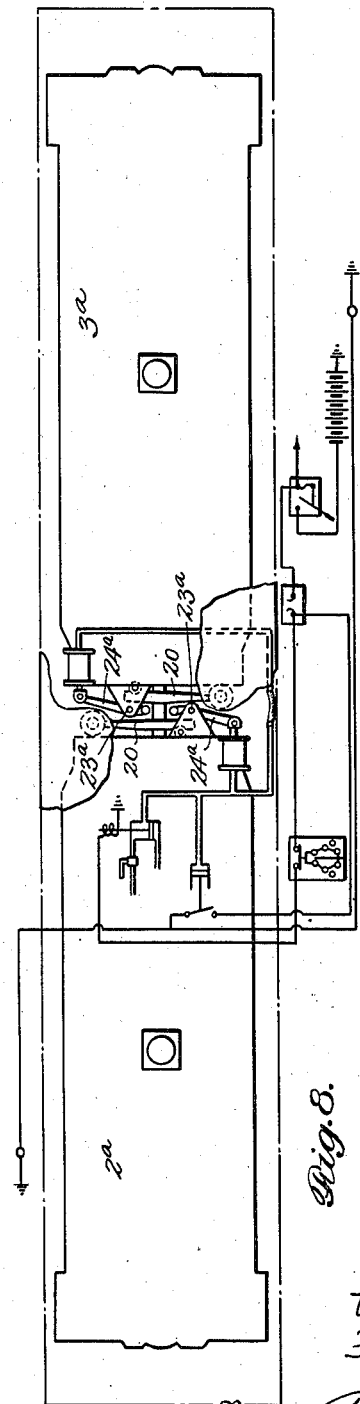
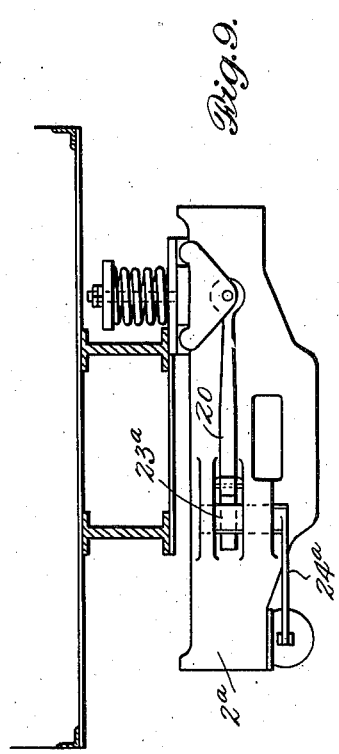
Inventor
William S. H. Hamilton and
Frederic W. Butt
By
Attorney Patented Oct. 25, 1938

2,134,443

UNITED STATES PATENT OFFICE 2,134,443

CENTERING DEVICE FOR LOCOMOTIVE TRUCKS

William S. H. Hamilton, Larchmont, and Frederic W. Butt, Woodside, N. Y., assignors to The New York Central Railroad Company, a corporation of New York Original application September 4, 1936, Serial No. 99,490. Patent No. 2,116,944, May 10, 1938. Divided and this application June 4, 1937, Serial No. 146,504

22 Claims. (Cl. 105—175)

This application is a division of our prior application filed September 4, 1936, Serial No. 99,490, which has matured into U. S. Letters Patent No. 2,116,944 granted May 10, 1938.

This invention relates to centering devices for locomotive trucks, and particularly to means for controlling the swinging movements of the trucks of a locomotive relative to the locomotive superstructure, i. e., the locomotive cab or the cap supporting frame to which the trucks are swiveled. More particularly the invention relates to a novel construction and arrangement of centering devices and controlling means for governing the action of each centering device according to track and speed conditions, said controlling means operating to automatically regulate and variably govern the action of the centering devices in the travel of the locomotive at different speeds and about curves and along straight portions of a track so as to regulate the restraining action of the centering device as required according to varying track conditions and varying speeds of travel of the locomotive.

The spring centering devices commonly employed in connection with swivel trucks exert forces tending to hold their swivel trucks in line with the other trucks and resisting swiveling. These forces are adjustable but do not vary with the speed of the locomotive. Such devices, however, if designed with sufficient flexibility for swiveling action of the swivel trucks to allow easy travel of the locomotive about sharp curves at slow speed, at and below, for example, twenty miles per hour, do not offer sufficient resistance against undesirable swiveling or nosing of the truck when the train is traveling on straight or comparatively straight portions of the track at higher speeds and particularly at very high running speeds, when, as a safety measure, nosing should be prevented.

One object of the invention is to provide simple, reliable and efficient means for controlling a centering device governing the swiveling action of a truck in such a way as to allow free swiveling motion of the truck relative to the locomotive cab or cab frame when traveling about curves at or below a predetermined speed and to give positive restriction to the centering device, with maximum resistance to truck swiveling motions, when traveling at speeds above such predetermined speed, thereby preventing nosing of the locomotive.

A further object of the invention is to provide means for automatically locking the centering device at or above a predetermined speed and releasing it below that speed, to provide maximum resistance to swiveling moment of the truck when locked and when released to allow free swiveling movement.

A still further object of the invention is to provide a speed controlled elastic restrain connection between each truck of a locomotive and the locomotive cab or cab supporting frame including a centering device and controller therefor, and locking and releasing means for the controller governing the same in such manner that when the controller is locked there will be sufficient freedom of swiveling action and of relative movement between the trucks and trucks and locomotive cab frame for easy travel with maximum safety at high speeds, and so that when the controller is released there will be enough additional freedom of swiveling action and relative motion of the trucks to permit the locomotive to pass easily and freely around curves at low speeds.

A still further object of the invention is to provide means for holding two articulated trucks of an articulated truck locomotive in a predetermined elastic restraint relationship with the locomotive cab frame above a predetermined locomotive speed and free from such restrain or at less restrain at a locomotive speed below such predetermined speed.

With these and other objects in view, the invention consists of the features of construction, combination and arrangement of parts, hereinafter fully described and claimed, reference being had to the accompanying drawings, in which:—

Fig. 1 is a side elevation showing the application of the invention, for exemplification, to a double ended electric locomotive having articulated trucks, and showing a form of the invention in which the centering devices are mounted on the trucks and the locking and releasing means on the cab frame.

Fig. 2 is a diagrammatic plan view showing the arrangement of the controlling means on the locomotive cab frame.

Fig. 4 is a transverse section through the cab frame showing one of the trucks in end elevation.

Figs. 7 and 8 are views similar to Figs. 1 and 2 showing a modified arrangement in which the centering devices are mounted on the cab frame and the locking and releasing means on the trucks.

Fig. 9 is a view similar to Fig. 4 showing the parts illustrated in Figs. 7 and 8.

Figure 3:
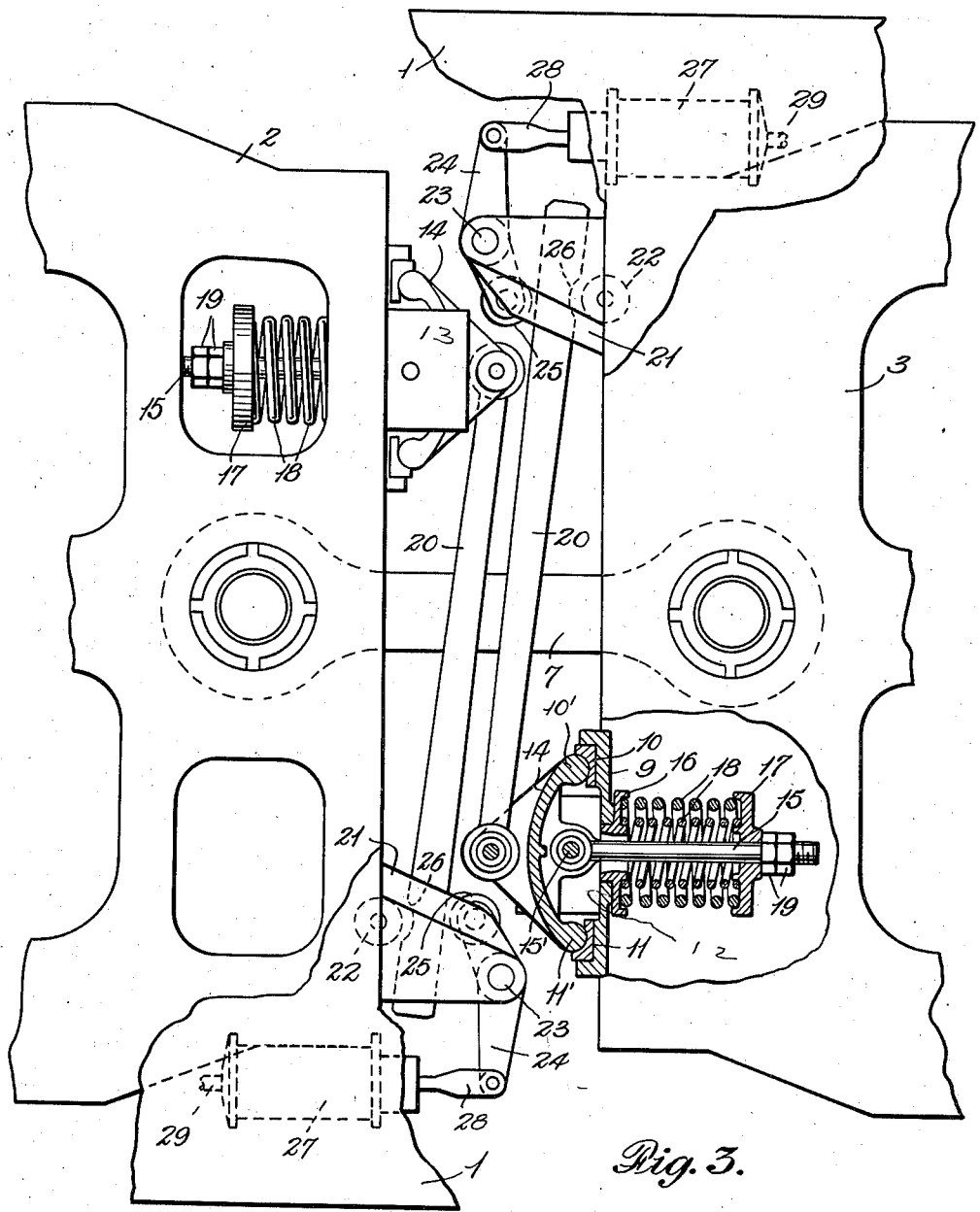
Fig. 3 is a plan view on an enlarged scale of portions of the cab frame and a truck showing the centering device on the truck and coacting parts of the locking and releasing means on the cab frame, the centering device appearing in section.

In the embodiment of our invention as herein disclosed we have shown its application to a double ended type of electric locomotive 1 having similar wheeled trucks 2 and 3 swiveled, as indicated at 4, to the cab supporting frame 5 of the cab 6 mounted thereon. The trucks 2 and 3 have an articulated coupling connection 7 at their inner ends and said trucks are adapted to serve respectively as leading or pilot and trailing trucks in the travel of the locomotive in the direction in which either is at the head of the other in the direction of travel.

Figure 5:
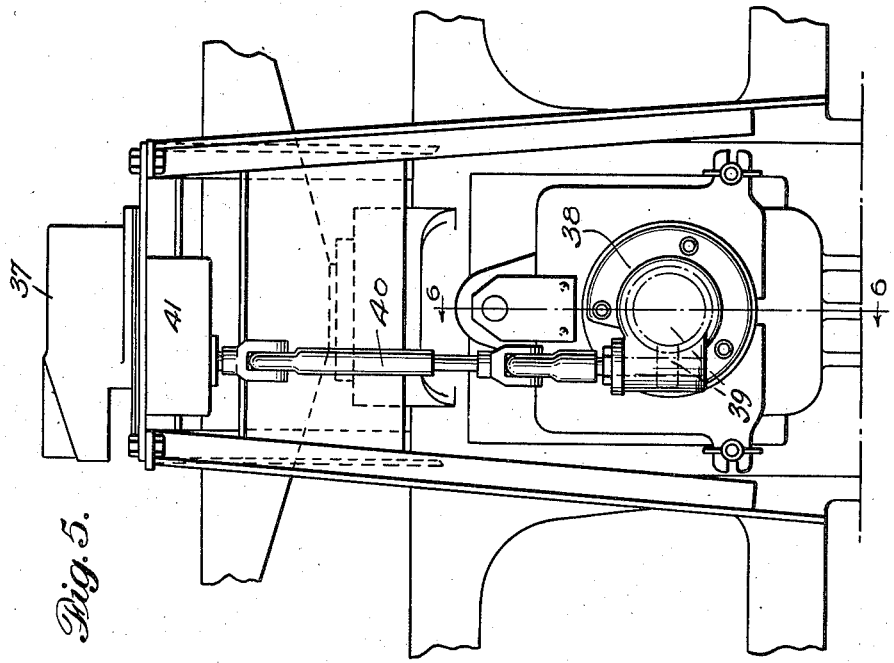
Fig. 5 is an enlarged side elevation of a portion of a truck frame showing the speed switch drive arrangement.
Figure 6:
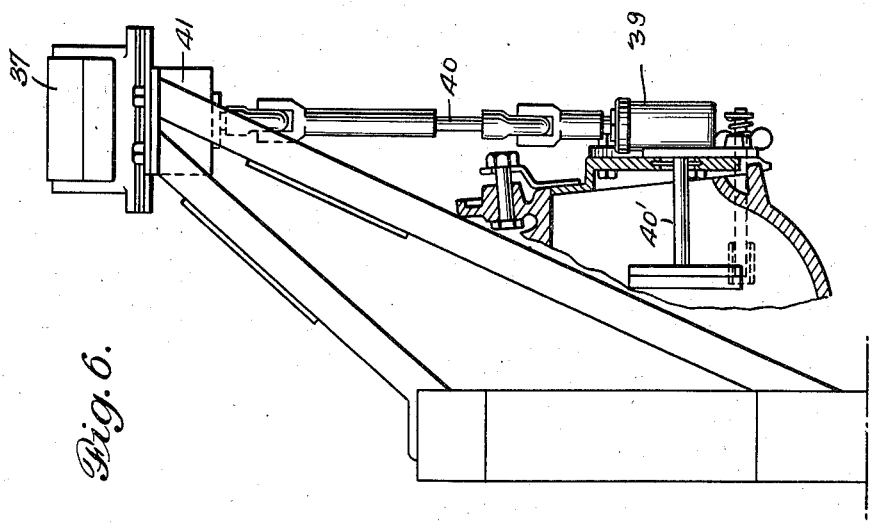
Fig. 6 is a transverse section taken substantially on line 6—6 of Fig. 5.

Two alternative forms of our invention are herein shown in Figs. 1 to 6, inclusive, and 7 to 9, inclusive, the construction of the working parts being substantially the same in each case, but the arrangement of the centering devices and their controlling devices differing in their mounting on the truck and cab frame. Figs. 1 to 6, inclusive, show an arrangement in which the centering devices are mounted on the truck frame and their controlling devices are mounted on the cab frame, while Figs. 7 to 9, inclusive, show a reverse arrangement. Either of these arrangements may be used as desired or considered preferable in the practical application of the invention.

In the arrangement shown in Figs. 1 to 6, inclusive, centering devices 8 of similar type are mounted upon the inner or adjacent ends of the trucks. Each of these centering devices comprises a supporting head or plate 9 provided in its outer face with spaced seat recesses 10 and 11. Mounted between projections 12 and 13 extending from the head 9 is a rocker arm or lever 14 having at opposite sides thereof fulcrum portions 10' and 11' normally engaging said recesses in the centered position of said arm or lever. A floating rod or bolt 15 is movable freely through openings in the head 9 and through stationary and movable spring caps or washers 16 and 17 and is pivoted at its outer end, as at 15', to the rocker lever. Disposed about this rod between the spring washers 16 and 17 are coiled centering springs 18, the tension of which may be regulated by securing and tensioning nuts 19 on the rod 15, and which springs oppose a resistance to the endwise floating movement of the rod 15 and the rocking movements of the lever 14. The lever 14 is coupled to one end of a controlling bar or link 20, the opposite or free end of which is permitted to slide without restraint or is positively held from movement by cooperating controlling or locking and releasing mechanism mounted on the cab frame 5, whereby the action of the centering device is controlled to regulate its degree of resistance to the swiveling movement of the truck on which it is mounted relative to the cab frame and the relative lateral motion of the adjacent ends of the trucks. The centering devices 8 carried by the respective trucks are arranged at opposite sides of said trucks, or on opposite sides of the center line of the locomotive.

The said controlling or locking and releasing mechanism provided for governing the action of each centering device comprises a suitable support 21 fixed to the cab frame, which support forms a guide for the free end of the link 20. On the support is mounted a fixed guiding and clamping roller 22 against which one side of the link 20 bears and pivotally mounted on the support is a shaft 23 carrying a clamping lever 24 and a pair of arms between which is journaled a clamping roller 25 bearing against the opposite side of the link, which roller 25 is placed opposite the roller 22 and is movable toward and away from the same by reverse swinging movements of the lever 24. In the side of the link facing the roller 22 is a locking notch or recess 26 adapted to be positioned in line with said roller when the centering device is in centered position, so that when the notch is in such position and lever 24 is operated to force the roller 25 toward the roller 22 the link 20 will be clamped between the rollers and locked from movement by engagement of the notch 26 with the roller 22.

The lever 24 is movable to a sufficient degree in the opposite direction to withdraw the roller 25 to an extent to allow the link 20 to release itself from engagement with the roller 22, while maintaining the rollers 22 and 25 in position to form guides and retainers allowing the link 20 when released to have limited sliding movements transversely of the locomotive and pivotal movements in both directions longitudinally of the locomotive.

When the link 20 is in released position the truck carrying the centering device which it controls can swing freely independently relative to the cab frame and the associated truck to which it is articulated to the minimum extent allowed by permanent stops, permitting the trucks to guide the locomotive freely about sharp curves in the track. The link is released in practice at speeds below a predetermined value, for example twenty miles an hour, below which speed the locomotive is free to travel about sharp curves without substantial restriction. For cooperation with the controlling link or lever of each centering device we provide a means dependent upon the speed of the locomotive for automatically causing the coacting link locking mechanism to lock or release the link 20; that is, at or below a predetermined speed the centering device is freed, while at any speed above the predetermined value the link 20 will be locked to allow only a limited range of motion of the centering device, thereby giving maximum elastic resistance to the swinging or swiveling movement of the truck relative to the cab frame and the centering devices operating under such conditions to control the relative lateral motion of adjacent ends of the trucks so as to prevent the leading truck from "nosing" at high speeds.

The automatic means for controlling the locking and releasing mechanism of the controlling link of each centering device comprises a servo-motor in the form of an air cylinder and piston 27 mounted on the cab frame, which piston is coupled to the clamping or locking lever 24 by a connecting rod 28. The motor cylinder is connected, through a feed pipe 29 and an electropneumatic control valve 30, with an air supply pipe 31, which may be in practice a part of the main reservoir system or other source of compressed air on the locomotive. A hand valve 32 is provided in the pipe whereby the air feed connection may be cut out when desired. The magnet coil 33 of the electo-pneumatic valve 30 is arranged in a conductor 34 normally connected to a supply circuit 35 including a battery 36 or other source of electric energy and a battery cut in and cut out switch 36'', which circuit may form a part of the lighting system of the locomotive, and said conductor is adapted to be thrown into and out of connection with the supply circuit by means of a speed controlled switch 37. At all times in the open condition of the switch 37 the pipe 29 is opened to the feed pipe 31 through the valve 30, so that air is supplied to the cylinder 27 to hold the locking mechanism in engagement with the control link 20. The switch 37 when closed supplies current to energize the magnet coil 33 whereby the valve 30 opens communication between the atmosphere and the cylinder and air is released from the cylinder to retract the locking and releasing mechanism and release the link 20. The switch 37 is opened and the valve 30 admits air to pipe 29 at all speeds above the predetermined speed, but the switch 37 is closed by its speed controlling mechanism when the speed of the locomotive falls below the predetermined speed, whereupon the coil 33 is energized to cut off the air supply to the motor cylinder for a link releasing action. Thus in the event of any failure in the electrically controlled part of the apparatus air will be supplied to the motor cylinder to lock the connecting link 20, making it safe to operate the locomotive at high speed.

As stated, the switch 37 is closed at speeds below twenty miles per hour, opens at higher speeds so that the locking mechanism will always be in action to lock the link 20 in maximum resistance position in the event of failure of the electrical part of the control means to perform its releasing action, and so that the link 20 will be released only in the travel of the locomotive at slow speed. The means for controlling the switch 37 in this manner comprises a gear box 38 secured to the lid or cover of one of the journal boxes of one of the trucks, in which box are enclosed gears 39 driven through a suitable connection 40' from the axle and coupled by a flexible shaft 40, i. e., a shaft formed of universally jointed sections, with a switch operating device 41 active at speeds above twenty miles per hour to open the switch but negative at speeds below twenty miles per hour which allows the switch 37 to close again.

A pressure controlled switch 42 may be provided for controlling the supply of current to pilot or signal lamps 43 positioned at opposite ends of the cab. This switch 42 communicates with pipe 29 so as to be normally subjected to air pressure from line 29 to move the switch member 42 against the resistance of a switch opening spring (not shown) forming part of said switch, to connect the lamps 43 with the current supply circuit so long as valve 30 admits air to the cylinder 27, thus indicating that the electrically controlled part of the system is working and the system in condition for full control actions. When the switch 37 closes at the predetermined speed of the locomotive and coil 33 is energized to move valve 30 to air vent position the switch 42 is relieved from air pressure and is shifted to open position by its spring, thus cutting off the supply of current to the pilot lights 43, indicating that link 20 is in released position and that the locomotive may be operated about sharp curves at low speed. Similarly, in the event of failure of the electrical part of the system the lamps, through their failure to glow, will give warning of this condition. The current supply circuits may also include a circuit breaker 44 of suitable type.

If desired, and as shown, the locking and releasing mechanisms controlling both centering devices may be connected with a common source of air supply and governed by the same set of electrical instrumentalities and a single speed controlled device so that the locking and releasing mechanism of both centering devices will be controlled in unison with each other and by the same control means, thus simplifying the construction and reducing the number of parts required to be used in the system.

As above described, and as shown, the centering devices are mounted upon the respective trucks on opposite sides of the longitudinal center of the locomotive, and the servo-motors and associated parts of the respective locking and releasing devices are similarly mounted with respect to each other. This arrangement permits the control levers 20 to be extended in opposite directions transversely of the locomotive so as to lie in substantially parallel relation between the adjacent inner ends of the trucks, allowing the parts to be compactly mounted.

It will be apparent from the foregoing that we have provided equivalent means mounted on each individual truck and the locomotive cab frame for elastically controlling the oscillating movements of the respective trucks with respect to the cab frame, each individual truck being independently controlled with regard to the elastic resistance opposed to its oscillations, but at the same time being commonly controlled through the concurrent actions of its centering devices to regulate the oscillations of the adjacent ends of the trucks.

In the alternative form of our invention shown in Figs. 7 to 9, inclusive, the arrangement of the centering devices and motor cylinders is reversed from that shown in Figs. 1 to 6, inclusive, in that the centering devices are mounted on the locomotive cab frame 5a, while the motor cylinders and coacting parts are arranged on the trucks 2a and 3a. In the organization shown in Figs. 7 to 9, inclusive, the centering devices are also shown as being disposed for convenience of arrangement and cooperation with the other parts in a vertical position, while the motor cylinders are arranged horizontally on the trucks. This arrangement requires the location of each cylinder at a lower elevation than the coacting link 20 and clamping arm 24a and the mounting of the arm on a rock shaft 23a journaled on the truck. Otherwise the construction and operation of the parts is the same as set forth in connection with the form of the invention shown in Figs. 1 to 6, inclusive.

From the foregoing description, taken in connection with the drawings, the construction and mode of operation of our improved means for controlling a centering device or devices to regulate the resistance thereof to independent or conjoint swiveling movements of the oscillating trucks of the locomotive cab frame or cab will be readily understood without a further and extended description, and it will be seen that the invention provides means for automatically controlling the action of the centering device or devices at speeds below and above a predetermined speed of the locomotive to release the centering device or devices at low and safe speeds while locking the centering device or devices at high speeds to exert maximum restraining action against the movements of the truck or trucks to prevent nosing of the leading truck and undue swiveling of the following truck at high speeds, so that maximum flexibility of truck action is permitted at low speeds and safety against undue swiveling or nosing secured at high speeds. Also it will be seen that the invention provides a means whereby in the event of failure of the means provided for energizing the magnet coil 33 to function from any cause, the centering device or devices will be locked in maximum restraining position so that the locomotive may be driven at high speeds with safety. By providing centering devices whereby the trucks are held in a certain elastic relationship to the locomotive frame or cab above a predetermined speed and allowed to have free action or are limited in action to allow greater freedom of movement of the trucks at speeds below such predetermined locomotive speed a wide range of truck restraint is permitted for safe travel on straight and sharply curved tracks at speeds suitable for the portions of the track being traveled, both trucks being controlled by placing them under proper elastic restraint suitable for the speed at which they are traveling.

It is to be understood, of course, that the invention may be employed in either of the ways described or in any other possible ways for controlling the articulated trucks of a locomotive of the type employing two or more trucks.

While the structures herein disclosed, and shown for exemplification, are preferred, it will, of course, be understood that changes in the form, proportion and details of construction of the parts may be made within the scope of the appended claims, without departing from the spirit or sacrificing any of the advantages of the invention.

What we claim is:—

1. The combination with a locomotive cab having a supporting frame rigid therewith and a truck frame directly swiveled to said cab supporting frame of a speed controlled restraining connection between said frames operable in the travel of the locomotive to oppose a predetermined resistance to the swiveling movements of the truck frame at and above a predetermined speed of the locomotive.

2. The combination with a locomotive cab having a supporting frame rigid therewith and a truck frame directly swiveled to said cab supporting frame of a centering device on one of said frames for imposing a resistance to the swiveling movements of the truck frame, and speed controlled means on the other frame governing the centering device to cause it to impose such resistance at and above a predetermined speed of the locomotive.

3. The combination with a locomotive cab frame, and a pair of truck frames swiveled thereto, of speed controlled restraining devices, one connecting each truck frame with the cab frame, and operable in the travel of the locomotive to oppose a predetermined resistance to the swiveling movements of the truck frame at and above a predetermined speed of the locomotive.

4. The combination with a locomotive cab frame, and a pair of truck frames swiveled thereto, of a speed controlled restraining connection between each truck frame and the cab frame comprising a centering device on one of said frames for imposing a resistance to the swiveling movements of the truck frame, and speed controlled means on the other frame governing the centering device to cause it to impose such resistance at and above a predetermined speed of the locomotive 5. The combination with a locomotive cab frame, and two truck frames articulated to each other and each swiveled to the cab frame, of a speed controlled restraining connection between each truck frame and the cab frame comprising a centering device on one of said frames for imposing a resistance to the swiveling movements of the truck frame, and speed controlled means on the other frame governing the centering device to cause it to impose such resistance at and above a predetermined speed of the locomotive.

6. In a locomotive, a cab having a supporting frame rigid therewith, a truck frame directly swiveled to said cab supporting frame, a spring centering device mounted on one of the frames for opposing a resistance to the swiveling movements of the truck frame, and speed responsive controlling means mounted on the other frame and governing the centering device to cause it to oppose such resistance at and above a predetermined locomotive speed.

7. A locomotive having a frame and two articulated trucks swiveled thereto, a centering device for connecting each truck to the frame for controlling the swinging movements of each truck with respect to the frame, and automatic means, governed by the speed of the locomotive, for regulating the resistance of the centering devices to the swinging movements of the trucks.

8. A locomotive having a frame and two articulated trucks swiveled thereto, centering device connecting the respective trucks with the frame and governing the swiveling movements of the trucks, a locking and releasing means for controlling the resistance of each centering device to swiveling movements of its truck, and means governed by the speed of the locomotive for controlling said locking and releasing means of the centering devices for locking and releasing actions.

9. A locomotive having a frame and two articulated trucks swiveled thereto, a centering device for connecting each truck to the frame for controlling the swiveling movements of the truck with respect to the frame, said device including a pivotally mounted resistance controlling element lockable and releasable for governing the amount of resistance of said device, and automatic means governed by the speed of the locomotive for locking and releasing said element.

10. A locomotive having a cab, a supporting frame rigid with the cab and a truck frame directly swiveled to said cab supporting frame, and a controlling connection between the cab supporting frame and the truck frame comprising a centering device carried by one of the said frames for elastically controlling the swinging motion of the truck frame and including a control member for regulating the amount of resistance of said device, and speed controlled electropneumatic locking and releasing means on the other frame for engagement with said control member to hold it in position for maintaining the centering device in centering position at locomotive speeds above a predetermined speed and releasing it to permit the centering device to move freely for free swinging movements of the truck at locomotive speeds below such predetermined speed.

11. A locomotive having a cab, a cab supporting frame rigid with the cab and a truck frame directly swiveled to said cab supporting frame, a centering device on one of said frames for elastically controlling the relative swinging movements of the truck frame, said centering device including a control element, means on the other of said frames for engagement with said element to hold the centering device in centering position or for releasing said element to allow swinging movement of the truck frame, and speed controlled means governing the first-named means for automatic locking and releasing actions at different locomotive speeds.

12. A locomotive having a cab, a cab supporting frame rigid with the cab and a truck frame directly swiveled to the cab supporting frame, a centering device on one of the frames for elastically controlling the swinging movements of said truck frame, and speed controlled means on the other frame coupled to and governing the centering device to permit the same to have its normal range of movement at a predetermined low speed of the locomotive and for locking the centering device to oppose an elastic resistance to the swinging movements of the truck at higher speeds of the locomotive.

13. A double ended locomotive having a frame and two articulated trucks swiveled thereto, restraining means connecting the trucks with the frame for elastically controlling the oscillations of each truck with respect to the locomotive frame, and means governing said restraining means for establishing an elastic resistance to the swinging movements of each truck at speeds above a predetermined speed of the locomotive.

14. A locomotive having a cab, a cab supporting frame rigid with the cab and a truck frame directly swiveled to the cab supporting frame, a centering device on one of the frames for elastically controlling the oscillations of the truck frame, a link connected with the centering device whereby its controlling actions may be controlled, and means on the other frame and governed by locomotive speeds for automatically locking and releasing said link.

15. A locomotive having a cab, a supporting frame for the cab rigid with the cab and a truck frame directly swiveled to said cab supporting frame, a centering device on one of the frames including a centering spring and a lever mechanism through which the resistance of the spring is transmitted to oppose swinging movements of the truck frame, a connecting link for locking said lever to and unlocking it from the other frame, locking means on the latter-named frame cooperating with said link for such locking and unlocking actions, and means governed by locomotive speeds for throwing said locking means into and out of action.

16. A locomotive having a cab frame and two articulated truck frames swiveled thereto, and a restraining connection between the cab frame and each truck frame comprising a centering device on the truck frame including a centering spring and a lever mechanism through which the resistance of the spring is transmitted to said truck frame, a connecting link for locking said lever to and unlocking it from the other frame, locking means on the latter-named frame normally engaging the link to hold the centering device in maximum resistance position, and locomotive speed controlled means for releasing said locking device at a predetermined low locomotive speed without affecting its locking action at higher locomotive speeds.

17. A locomotive having a cab frame and two articulated truck frames swiveled thereto and a restraining connection between the cab frame and each truck frame comprising a centering device on one of said frames for opposing an elastic resistance to the swinging movements of the truck frame, a device for locking said centering device in its position for establishing a maximum resistance to the swinging movements of the truck frame or releasing it for free movements of the truck frame, actuating means for the locking device normally effective for maintaining the locking device in action at all locomotive speeds, and means effective for influencing said actuating means at predetermined low speeds of the locomotive to release said locking device and ineffective for such action at higher locomotive speeds.

18. A locomotive having a cab frame and two articulated truck frames swiveled thereto, and a restraining connection between the cab frame and each truck frame comprising a centering device on one of said frame for opposing an elastic resistance to the swinging movements of the truck frame, a coupling member associated with the centering device, a device on the other frame for coaction with said coupling member for locking the centering device in its position for establishing a maximum resistance to the lateral movements of the truck frame or releasing it for free movements of the truck frame, actuating means for the locking device normally effective for maintaining the locking device in action at all locomotive speeds, and means effective for influencing said actuating means at predetermined low speeds of the locomotive to release said locking device and ineffective for such action at higher locomotive speeds.

19. A locomotive having a cab frame and two articulated truck frames swiveled thereto and a restraining connection between the cab frame and each truck frame comprising a centering device on one of the frames for opposing a variable elastic resistance to the swinging movements of the truck frame, a locking device for connecting the centering device with or disconnecting it from the other frame for holding said centering device in its maximum resistance position or releasing it for free movements of the truck frame, pneumatic means for normally maintaining the locking device in locking position, electrical control means effective for action on said pneumatic means when set into action to release the locking means, and locomotive speed governed means operative on said electrical control means to release the locking device at predetermined low locomotive speeds but ineffective for such action at higher locomotive speeds.

20. A locomotive having a frame and two articulated trucks swiveled thereto, in combination with speed controlled means connecting the frame and trunks for holding the two articulated trucks elastically resistant to swinging movements at speeds above a predetermined speed of the locomotive.

21. In a railway vehicle, the combination with a vehicle body structure and a truck directly swiveled thereto, of elastic restraining means comprising elements interposed between the body structure and truck for opposing an elastic resistance to the swiveling movements of the truck relatively to the body structure above a predetermined vehicle speed, and speed controlled means for throwing said restraining means into and out of action.

22. A locomotive having a swiveled truck and a cab structure, and a speed responsive restraint device disposed between and operatively connecting the truck and cab structure to hold the truck elastically coupled to the cab structure at and above a predetermined speed of the locomotive so as to elastically restrain the swiveling movements of the truck.

WILLIAM S. H. HAMILTON.
FREDERIC W. BUTT.